United States Patent [19]

Bourgoine

[11] Patent Number: 5,174,434
[45] Date of Patent: Dec. 29, 1992

[54] APPARATUS FOR PROVIDING ROTATIONAL MOTION ON A CARRIER MOVING ALONG A DRIVEN CONVEYOR

[75] Inventor: Clifford L. Bourgoine, New Durham, N.H.

[73] Assignee: Davidson Textron Inc., Dover, N.H.

[21] Appl. No.: 887,045

[22] Filed: May 22, 1992

[51] Int. Cl.⁵ .............................................. B65G 17/32
[52] U.S. Cl. ............................. 198/803.01; 198/803.2
[58] Field of Search ............... 198/377, 803.01, 803.2, 198/802

[56] References Cited

U.S. PATENT DOCUMENTS

| | | |
|---|---|---|
| 3,650,375 | 3/1972 | Fleischauer et al. |
| 3,858,716 | 1/1975 | Frische ........................ 198/377 |
| 3,902,589 | 9/1975 | Bylsma. |
| 3,921,255 | 4/1976 | Shuttleworth et al. |
| 4,198,833 | 4/1980 | Fleischauer et al. |
| 4,511,025 | 4/1985 | Nakayama ................. 198/377 |
| 4,640,406 | 2/1987 | Willison .................... 198/377 |
| 5,090,553 | 2/1992 | Focke ........................ 198/377 |

FOREIGN PATENT DOCUMENTS 618001 6/1980 Switzerland ................ 198/377

Primary Examiner—D. Glenn Dayoan
Attorney, Agent, or Firm—Reising, Ethington, Barnard, Perry & Milton

[57] ABSTRACT

A transport system is provided which includes a conveyor having an alternate forwardly and reversely driven rollers. A carrier disposed on the conveyor has a pair of spaced skis which engage the forwardly rotating rollers to move the carrier along the conveyor. A friction belt disposed over a pair of pickup rollers on the carrier engages the reversely rotating rollers on the conveyor to provide a rotational drive for use on the carrier. An alternative embodiment is also disclosed which provides rotational motion on the carrier only when the carrier is moving along the conveyor.

12 Claims, 3 Drawing Sheets

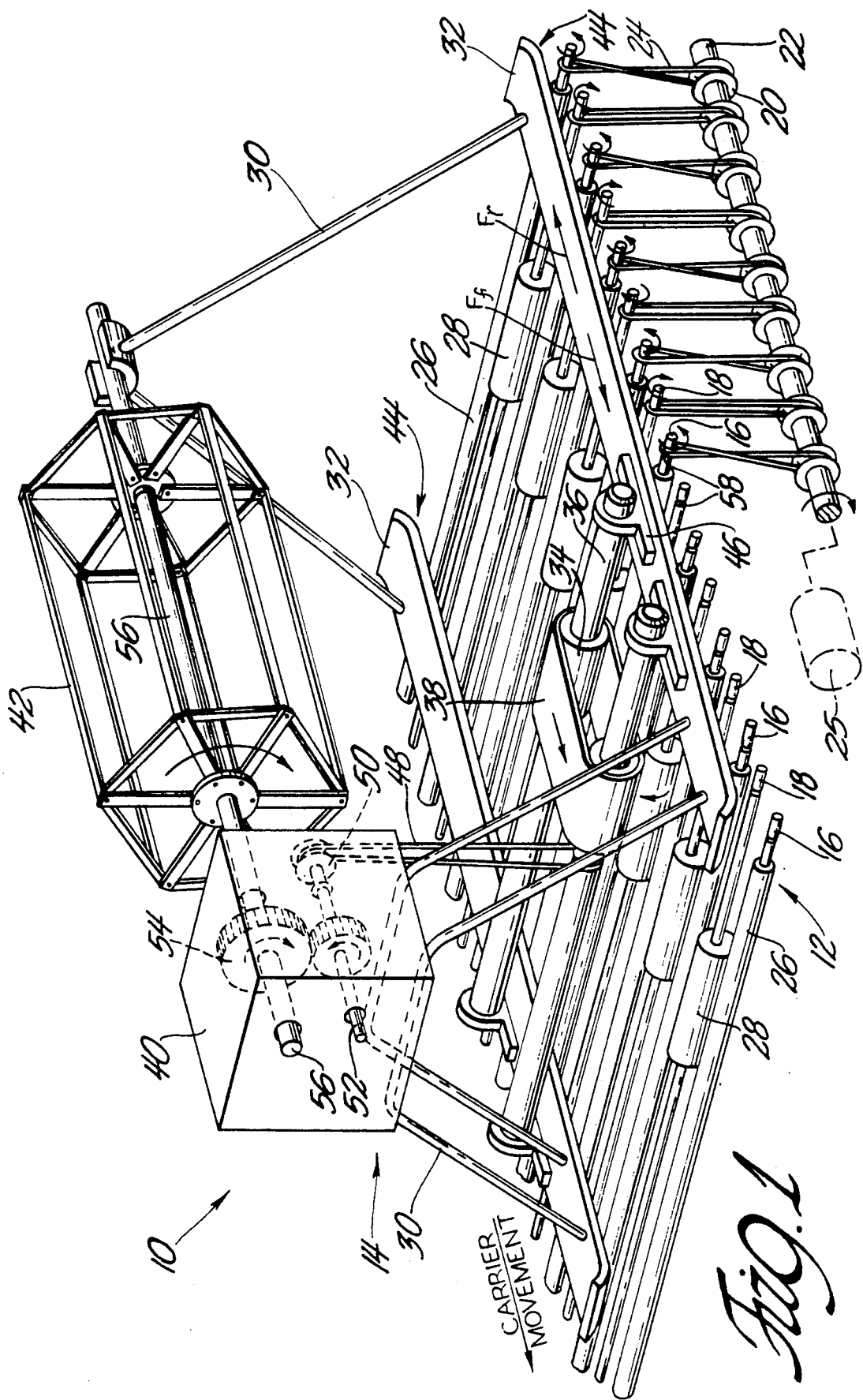

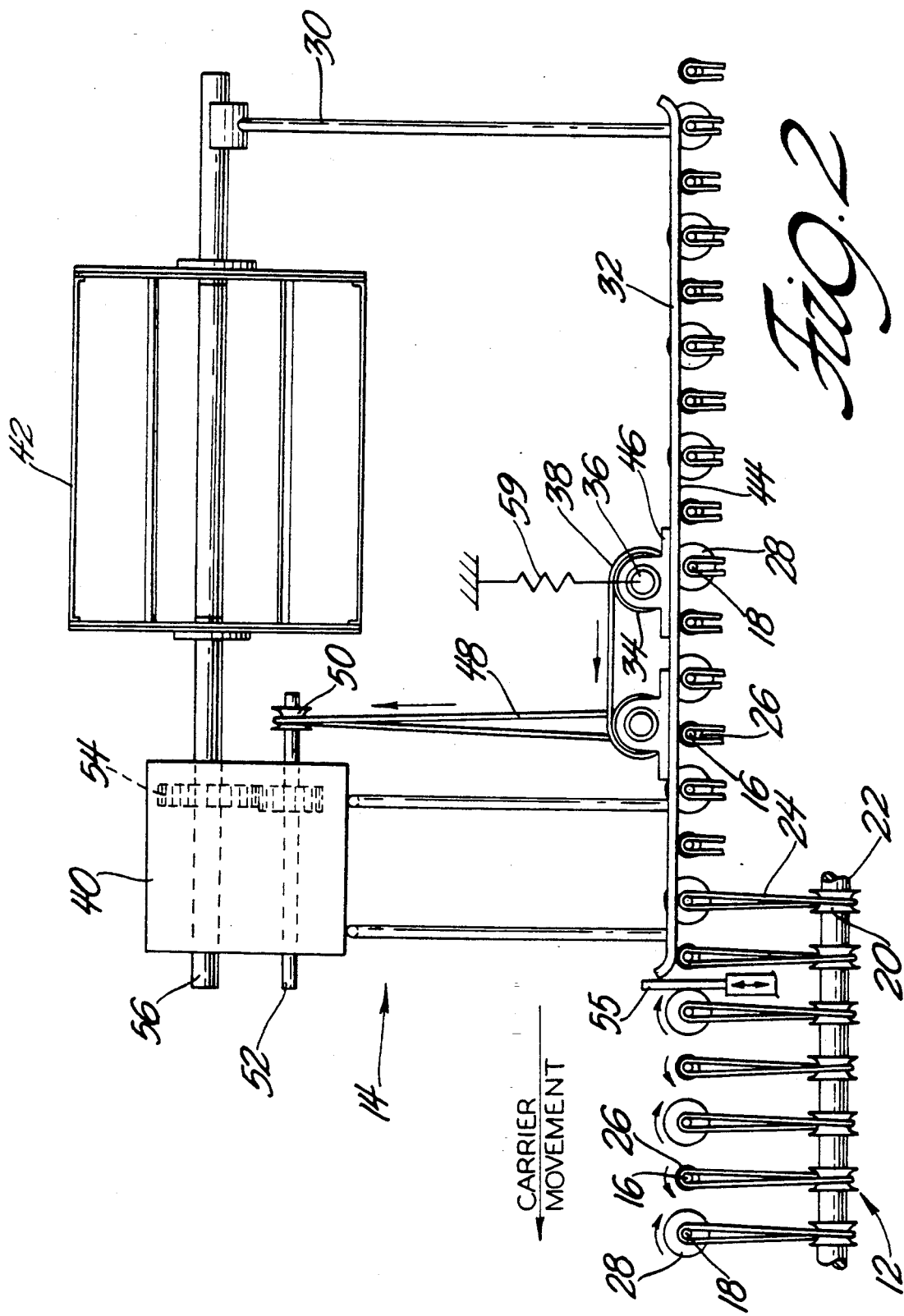

APPARATUS FOR PROVIDING ROTATIONAL MOTION ON A CARRIER MOVING ALONG A DRIVEN CONVEYOR

BACKGROUND OF THE INVENTION

1. Field of the Invention

The invention relates generally to driven conveyor systems and, in particular, to a driven conveyor system for producing rotational motion on a carrier situated on the conveyor to thereby permit various operations to be performed on the carrier as it moves along the conveyor.

2. Description of the Related Art

Driven conveyors permit items to be automatically moved from one location to another and are widely used in the manufacturing industry for a variety of applications, including assembly and process lines. Typically, these conveyors include a series of driven rollers successively disposed to form a generally horizontal pass line. Each roller is located upon a driven shaft that is rotatably mounted at its ends on a conveyor frame. A main shaft extends along the frame underneath one end of each of the driven shafts. The main shaft is typically coupled to the driven shafts by a elastomeric belt so that rotation of the main shaft causes a corresponding rotation of the driven shafts and, therefore, the rollers. Examples of this type of driven conveyor can be found in U.S. Pat. No. 3,650,375 to F. J. Fleischauer et al., U.S. Pat. No. 3,902,589 to J. M. Bylsma, U.S. Pat. No. 3,951,255 to J. J. Shuttleworth et al., and U.S. Pat. No. 4,198,833 to F. J. Fleischauer et al.

In many applications, the items being manufactured are placed upon carriers which transport the item along the conveyor. Such carriers are especially useful for process lines in which parts being manufactured are to be moved between successive workstations or work areas for such operations as spray coating the parts with paint or some other finish and drying the parts in heated drying stations. When such parts are made by non-process line manufacturing processes, paint and drying booths are commonly used to coat and dry the manufactured parts. The parts are often disposed in these booths on an open-framed reel which rotates much like a ferris wheel to facilitate uniform and complete coating and drying of the parts. Although these open-framed reels have been utilized on carriers in process-line manufacturing, no system or apparatus has heretofore been disclosed which provides the advantageous rotation of the parts reel on the carrier while the carrier is situated upon the conveyor. More generally, no one has disclosed a carrier and conveyor system which provides any rotational motion on the carrier useful for performing functions on the carrier while it is situated on the conveyor. The aforementioned patents, while relating to driven conveyors, do not disclose or suggest such an apparatus.

SUMMARY OF THE INVENTION

The present invention includes an apparatus for providing rotational motion on a carrier disposed upon a conveyor. Different embodiments are disclosed which permit rotational motion upon the carrier under different conditions. A preferred embodiment includes a conveyor having alternate forwardly and reversely driven shafts. The reversed direction of rotation of the reversely driven shafts is provided by placing a reverse twist on the belts which couple the driven shafts to the main shaft. The forwardly driven shafts each include a forward roller disposed thereon which extends most of the length of the shaft. The reversely driven shafts each include a reverse roller disposed over a central portion thereof. The reverse rollers are shorter than the forward rollers, but have a larger diameter.

The carrier includes a pair of skis which, when situated upon the conveyor, sit across a plurality of forward rollers. The skis frictionally engage the forward rollers to move the carrier along the conveyor. The skis are separated by a distance that is greater than the length of the reverse rollers so that they do not come into contact with the reverse rollers. Instead, the reverse rollers engage a friction belt which spans a pair of pickup rollers on the carrier. The pickup rollers are rotatably mounted on cross-shafts extending between and journaled with respect to the skis. Thus, as the carrier is transported along the conveyor by the forward rollers, the reverse rollers cause the friction belt and, therefore, the pickup rollers of the carrier to rotate, thereby providing a rotational drive for use on the carrier. Additionally, if forward movement of the carrier is interrupted, such that the forward rollers slip with respect to either the driven shafts or the carrier skis, the reverse rollers will continue to impart rotation to the friction belt on the carrier.

In a second embodiment, a conventional conveyor is utilized to which is rigidly attached a stationary, planar coupling surface. The carrier has a pair of spaced skis which frictionally engage the rollers to move the carrier forward. A pickup roller rotatably mounted between the skis engages the coupling surface such that a rotational drive is provided for use on the carrier whenever the carrier moves along the conveyor.

BRIEF DESCRIPTION OF THE DRAWINGS

The preferred exemplary embodiments of the present invention will hereinafter be described in conjunction with the appended drawings, wherein like designations denote like elements, and:

FIG. 1 is a perspective view of a conveyor and carrier transport system of the present invention;

FIG. 2 is a side elevational view of the transport system of FIG. 1;

DETAILED DESCRIPTION OF THE PREFERRED EMBODIMENTS

Figure 4:
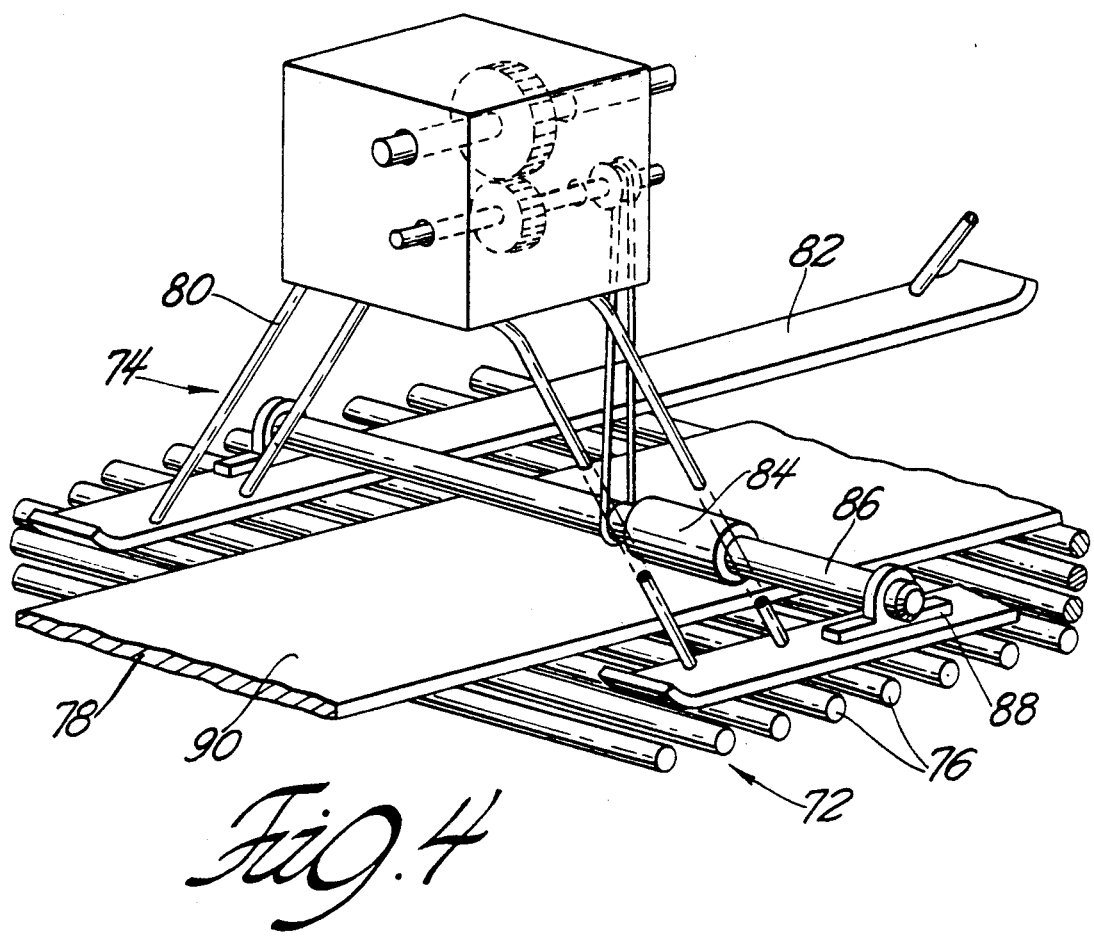
FIG. 4 is a partial perspective view of an alternative embodiment of the present invention.

Referring to FIGS. 1 and 2, a transport system of the present invention, designated generally as 10, includes a conveyor 12 and a carrier 14. Conveyor 12 includes a plurality of forwardly driven shafts 16 and a plurality of reversely driven shafts 18 interspersed among forward shafts 16. Forward shafts 16 and reverse shafts 18 comprise in the aggregate the driven shafts of conveyor 12. Each of the driven shafts are coupled to a pulley 20 located on a main shaft 22 by a drive belt 24. However, the belts 24 which couple reverse shafts 18 to main shaft 22 include a reverse twist so that forward shafts 16 and reverse shafts 18 will rotate in opposite directions whenever main shaft 22 rotates. Forward shafts 16, reverse shafts 18, and main shaft 22 are all rotatably mounted in a frame (not shown). The shaft 22 is driven by a suitable power source 25, such as an electrical drive motor and gear set suitably sized for a particular transport system 10.

A forward roller 26 is disposed on each forward shaft 16. Similarly, a reverse roller 28 is disposed on each reverse shaft 18. The combined uppermost tangential portion of each of forward rollers 26 defines the plane of conveyor 12 upon which carrier 14 sits. As described in greater detail below, when main shaft 22 is rotated by power source 25, forward rollers 26 frictionally engage carrier 14 to move it in the direction indicated in FIG. 1, while reverse rollers 28 engage carrier 14 to provide rotational motion on carrier 14.

Carrier 14 comprises a chassis 30, having a pair of skis 32, a pair of pickup rollers 34 disposed over corresponding pickup shafts 36, a friction belt 38, a gearbox 40, and a parts reel 42. Skis 32 each include a transport surface 44 on the underside thereof which frictionally engage forward rollers 26 when carrier 14 is placed upon conveyor 12. Pickup shafts 36 extend between skis 32. The ends of each shaft 36 are disposed for rotation in journal mounts 46 which are affixed to skis 32. Friction belt 38 is wrapped about pickup rollers 34 such that rotation of friction belt 38 causes rotation of pickup rollers 34. One of the pickup shafts 36 is coupled to gearbox 40 by any suitable arrangement such as a transmission belt 48 serving as a power take-off point for driving the parts reel 42. Specifically, transmission belt 48 transfers power from friction belt 38 via pickup rollers 34 and pickup shafts 36 to a drive pulley 50 mounted on a transfer shaft 52. Gearbox 40 includes a gear set 54 for transferring power from transfer shaft 52 to a main or reel axle 56 upon which parts reel 42 is mounted. Gear set 54 is a diagrammatic representation of a suitable power transfer system from transmission belt 48 to parts reel 42, with it being understood that gear set 54 could be a speed reducer, a speed increaser, or a direct drive. The gears, while shown as spur gears, can be other gear forms; e.g., bevel gears, worm gears, and gear sets, or could be replaced by other drives, such as friction rollers.

When carrier 14 is placed on conveyor 12, transport surfaces 44 of skis 32 frictionally engage forward rollers 26 and friction belt 38 engages reverse rollers 28. The outside circumferential surface of reverse rollers 28 therefore constitute a coupling surface for transferring relative rotational movement of reverse rollers 28 to carrier 14 via friction belt 38. Similarly, the outside surface of friction belt 38 constitutes a pickup surface on carrier 14 for providing rotational motion on carrier 14.

Reverse rollers 28 have a greater outside diameter than forward rollers 26 so that friction belt 38 will engage reverse rollers 28, but will not engage forward rollers 26. Preferably, reverse rollers 28 are disposed along a central portion of their corresponding reverse shafts 18 and have a length that is much less than the length of forward rollers 26. This provides the supporting skis 32 with room on opposite sides of reverse rollers 28 to sit upon forward rollers 26. Although each of the forward shafts 16 and reverse shafts 18 are depicted as being separate structures from the corresponding forward rollers 26 and corresponding reverse rollers 28, respectively, they can of course be formed as a unitary structure without departing from the scope of the present invention.

Operation of transport system 10 will hereinafter be described in conjunction with the multitude of non-designated direction indicating arrows provided in FIGS. 1 and 2. As best seen in FIG. 1, clockwise rotation of main shaft 22 causes counterclockwise rotation of forward shafts 16 via belts 24 and, because of the reverse twist put on belts 24, causes clockwise rotation of reverse shafts 18. The counter-clockwise rotation of forward rollers 26 causes carrier 14 to move along conveyor 12 as indicated due to the frictional engagement of the outside circumferential surfaces of forward rollers 26 with transport surface 44 of skis 32. The clockwise rotation of reverse rollers 28 causes counter-clockwise rotation of friction belt 38 due to the frictional engagement of the coupling surface (i.e., the outside circumferential surface of reverse rollers 28) with the pickup surface (i.e., the outer surface of friction belt 38). As explained above, rotation of friction belt 38 is transferred to gearbox 40 to thereby rotate parts reel 42. It will be appreciated that the speed and direction of rotation of parts reel 42 can be selected by a suitable configuration of gears, friction rollers, or other components within gearbox 40.

One advantage of the present invention is that forward movement of carrier 14 may be forcibly interrupted during operation of conveyor 12 without cessation of rotation of parts reel 42. This interruption can be, for instance, by such means as a barrier device selectively raised and lowered with respect to the path of carrier 14. When chassis 30 encounters such a barrier (shown at 55 in FIG. 2), forward rollers 26 will slip with respect to transport surfaces 44 of skis 32. Alternatively, slippable rollers can be utilized so that when carrier 14 is forcibly stopped, the frictional force between transport surfaces 44 and forward rollers 26 will be greater than the frictional force between forward shafts 16 and the forward rollers 26 disposed thereon such that those forward rollers 26 will stop rotating while the forward shafts 16 continue to rotate. In either circumstance, when forward progression of carrier 14 along conveyor 12 is interrupted, the rotation of parts reel 42 will slow. That is, under normal circumstances (i.e., when carrier 14 is transported along conveyor 12 by forward rollers 26), the speed of rotation of friction belt 38 is a function of both the forward speed of carrier 14 and the angular speed of reverse rollers 28. Thus, if forward progression of carrier 14 is interrupted, the forward speed of carrier 14 becomes zero, thereby removing that component of the speed of rotation of friction belt 38. The rotation of parts reel 42 will therefore slow somewhat.

It should be noted that the frictional force produced by the engagement of forward rollers 26 with transport surfaces 44 produces a force vector in the direction of the forward progression of carrier 14, as indicated by the arrow designated $F_f$ in FIG. 1. In a like manner, the frictional force produced by the engagement of reverse rollers 28 with friction belt 38 produces a force vector $F_r$ in FIG. 1 which opposes $F_f$. It will be appreciated that $F_f$ should be greater than $F_r$ so that there is a resultant force component in the forward direction. Otherwise, carrier 14 will not move forward along conveyor 12. The bottoms of skis 32 can be provided with pads or coatings of such material as rubber to increase the frictional engagement of forward rollers 26 with skis 32.

Although conveyor 12 is depicted as having alternating forward rollers 26 and reverse rollers 28, reverse rollers 28 can be interspersed among forward rollers 26 in any arrangement that permits carrier 14 to be transported along conveyor 12 while parts reel 42 rotates. For example, conveyor 12 can include adjacent pairs of forward rollers 26 with each pair separated by one of the reverse rollers 28. Pickup shafts 36 would then preferably be spaced farther apart to insure continuous contact of friction belt 38 with one of the reverse rollers 28. Other such configurations will hereafter become apparent to those skilled in the art.

Preferably, forward shafts 16 and reverse shafts 18 are coupled for rotation to main shaft 22 by belts 24. However, because in a preferred embodiment adjacent shafts of conveyor 12 rotate in opposite directions, each driven shaft could include a gear at one end that mates with the gears of the adjacent shafts. In this arrangement, rotation of one or intermittent ones of the driven shafts results in rotation of all of the shafts and the main drive shaft therefore need not be directly coupled to each of the driven shafts. Additionally, belts 24 are shown coupled to main shaft 22 by pulleys 20 and to the driven shafts by a groove 58 formed in each driven shaft. However, the particular means employed to couple main shaft 22 to the driven shafts is not at all pertinent to the present invention so that grooves, spools, pulleys, gears, sprockets and chains, or any other suitable means can be employed. The foregoing applies equally with respect to coupling the rotation of pickup shafts 36 to reel axle 56 of carrier 14.

As shown in FIGS. 1 and 2, journal mounts 46 rigidly fix the vertical distance between the bottom of friction belt 38 and the bottom of skis 32 (i.e., transport surfaces 44). This distance should be the same as the difference in outside diameters between forward rollers 26 and reverse rollers 28. If this distance is too great, reverse rollers 28 will not engage friction belt 38. If this distance is too small, carrier 14 could "ride up" on each reverse rollers 28 as one of the pickup rollers 34 pass over it, resulting in one or both of the skis 32 lifting off forward rollers 26. To eliminate these possibilities, pickup shafts 36, and therefore pickup rollers 34 and friction belt 38 could be biased against reverse rollers 28 by any suitable arrangement, as shown schematically at 59 in FIG. 2. For instance, journal mounts that permit vertical shifting of pickup shafts 36 could be utilized.

Figure 3:
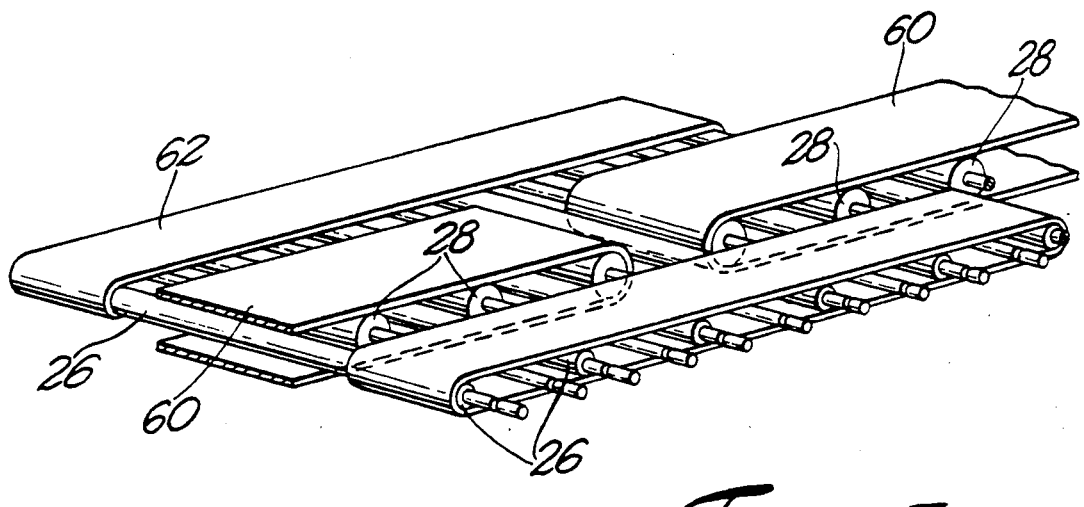
FIG. 3 is a perspective view of an alternative embodiment of the conveyor of FIG. 1, showing friction belts disposed over groups of forward and reverse rollers.

Preferably, pickup rollers 34 are spaced apart on skis 32 by a distance sufficient to permit friction belt 38 to be continuously in contact with at least one of reverse rollers 28 as carrier 14 moves along conveyor 12. This permits continuous rotation of parts reel 42. Other means for providing continuous rotation of parts reel 42 can be utilized. For example, the alternative embodiment of FIG. 3 includes one or more groups of reverse rollers 28 which are covered by one or more conveyor belts 60. If a single belt 60 is used or if belt 60 is provided along those sections of conveyor 12 which require continuous rotation of parts reel 42, then carrier 14 need only include a single pickup roller 34 so that friction belt 38 is not needed. Additionally, forward rollers 26 can also be wrapped as shown in FIG. 3 with one or more conveyor belts 62 to enhance frictional engagement of transport surfaces 44 with conveyor 12.

Although the embodiment illustrated in FIGS. 1 and 2 depict carrier 14 as having a pair of spaced skis and a pickup arrangement therebetween, as well as reverse rollers 28 having a greater outside diameter than forward rollers 26, it will be understood by those skilled in art that the particular dimensions and arrangements utilized are important only insofar as they permit carrier 14 to be transported along conveyor 12 by forward rollers 26 without hinderance by reverse rollers 28 and they allow the coupling surface on reverse rollers 28 to contact the rotatable pickup surface on carrier 14. For instance, reverse rollers 28 could have the same outside diameter as forward rollers 26, with reverse shafts 18 being disposed in the conveyor frame slightly above forward shafts 16 so that reverse rollers 28 extend above the plane of conveyor 12 defined by the uppermost tangential portion of forward rollers 26.

Moreover, it will be understood that this embodiment is diagrammatical only and the present invention can suitably be employed to implement any of a variety of functions on carrier 14, as will be understood by those skilled in the art. For instance, the rotational motion provided on carrier 14 could be used to operate an electric generator on carrier 14 to thereby operate an electrical circuit on carrier 14.

Other means of utilizing a rotatable pickup surface on the carrier can be utilized. For example, FIG. 4 shows an alternative embodiment of the present invention which utilizes a conveyor 72 and a carrier 74. Conveyor 72 includes a plurality of spaced rollers 76 that define a horizontal pass line. Rollers 76 preferably all have the same length and outside diameter and all rotate in the same direction to move carrier 74 along conveyor 72. However, conveyor 72 includes a stationary planar member or cam track 78 spaced above rollers 76 and rigidly connected to the conveyor frame (not shown). Carrier 74 is similar to carrier 14 of FIG. 1, so that only the detail of carrier 74 needed to explain its operation is shown in FIG. 4. Carrier 74 comprises a chassis 80, including a pair of skis 82, a single pickup roller 84 located on a pickup shaft 86 which is secured to skis 82 by a pair of rotatable mounts 88. Since only a single pickup roller is utilized in this embodiment, no friction belt is needed.

In this embodiment, the outer circumferential surface of pickup roller 84 constitutes the pickup surface of carrier 74 and an upper surface 90 of cam track 78 constitutes the coupling surface of conveyor 72. When carrier 74 moves along conveyor 72, surface 90 frictionally engages pickup roller 84 to cause rotational movement of pickup roller 84 at an angular speed equal to the speed at which carrier 74 moves along conveyor 72. Thus, in this embodiment, if the progression of carrier 74 is interrupted, rotation of pickup shaft 84 will be interrupted.

Although cam track 78 is depicted as being located above rollers 76, it will be understood that cam track 78 can be located in other locations, such as along the side of conveyor 72 so that surface 90 of cam track 78 would be vertically disposed. For each such variation, carrier 74 would be suitably configured so that its pickup surface frictionally engages the coupling surface of conveyor 72.

Moreover, other uses of the present invention should hereafter become apparent. For instance, the embodiments of FIGS. 1 and 4 can be used to periodically index the parts reel. This can be accomplished by placing reverse rollers 28 or cam track 78 of FIGS. 1 and 4, respectively, only at those locations along the conveyor in which indexing of the parts reel is desired.

It will thus be apparent that there has been provided in accordance with the present invention a transport system which achieves the aims and advantages specified herein. It will of course be understood that the foregoing description is of preferred exemplary embodiments of the invention and that the invention is not limited to the specific embodiments shown. Various changes and modifications will be obvious to those skilled in the art and all such variations and modifications are intended to come within the spirit and scope of the appended claims.

I claim:

1. A conveyor for providing rotational motion on a carrier transported by the conveyor, the carrier having a rotatable pickup surface for frictional engagement with the conveyor, the conveyor comprising:
 a main shaft;
 a plurality of forwardly driven shafts, each of said forwardly driven shafts spaced from said main shaft and located along a corresponding plurality of substantially parallel axes, said plurality of forwardly driven shafts coupled to said main shaft to rotate in a first direction upon rotation of said main shaft;
 a plurality of reversely driven shafts interspersed among said plurality of forwardly driven shafts and coupled to said main shaft to rotate in a direction opposite the first direction, each of said reversely driven shafts located along a corresponding plurality of axes substantially parallel to the axes of said forwardly driven shafts;
 a forward roller disposed on each of said plurality of forwardly driven shafts for transporting the carrier along the conveyor; and
 a reverse roller disposed over a section of each of said plurality of reversely driven shafts, said reverse rollers extending above the plane of the conveyor defined by the uppermost tangential portion of said forward rollers and disposed to cause the pickup surface of the carrier to rotate when the carrier is situated on the conveyor and said main shaft rotates.

2. A conveyor as defined in claim 1, wherein said plurality of forwardly rotating shafts and said plurality of reversely rotating shafts are disposed within a single plane and said reverse rollers have a greater outside diameter than said forward rollers.

3. A conveyor as defined in claim 2, wherein each of said plurality of forwardly driven shafts is disposed between a pair of said plurality of reversely driven shafts and each of said plurality of reversely driven shafts is disposed between a pair of said plurality of forwardly driven shafts, whereby the conveyor has alternating forwardly driven shafts and reversely driven shafts.

4. A conveyor as defined in claim 1, wherein said forward rollers extend for most of the length of said forwardly driven shafts and said reverse rollers are disposed over a central portion of said reversely driven shafts.

5. A conveyor as defined in claim 1, further comprising a friction belt disposed over said reverse rollers to frictionally engage the pickup surface of the carrier.

6. A carrier for use with a conveyor having a coupling surface and driven rollers disposed horizontally along substantially parallel axes, the driven rollers being coupled for simultaneous rotation to transport the carrier along the conveyor by frictional engagement of the carrier with the driven rollers, the carrier comprising:
 a chassis including a transport surface for frictional engagement with the driven rollers; and
 pickup means, rotatably disposed on said chassis for frictionally engaging the coupling surface to provide rotational energy on the carrier when the carrier is disposed on the conveyor and there is relative motion between the carrier and the coupling surface.

7. A carrier as defined in claim 6, further comprising a main axle rotatably mounted on said chassis and means for rotating said main axle when said pickup means rotates, and, further, wherein said pickup means includes a pair of pickup rollers rotatably mounted on said chassis and a friction belt frictionally disposed over said pair of pickup rollers for frictional engagement with the coupling surface.

8. A carrier as defined in claim 7, wherein said transport surface comprises a surface of a pair of skis disposed transverse said pickup rollers and, further, wherein said pickup rollers are rotatably mounted on said skis.

9. A carrier as defined in claim 6, further comprising a reel rotatably mounted on said chassis and a drive means for rotating said reel when said pickup means rotates.

10. A transport system, comprising:
 a conveyor having a frame and a coupling surface and including a plurality of forwardly driven rollers disposed horizontally along substantially parallel axes, said forwardly driven rollers being rotatably mounted to said frame and coupled for simultaneous rotation in a first direction; and
 a carrier having a chassis and a transport surface for frictional engagement with said forwardly driven rollers to transport said carrier along said conveyor, said carrier further including pickup means rotatably disposed on said chassis for frictionally engaging said coupling surface to provide rotational motion on said carrier when said carrier is disposed on said conveyor and there is relative motion between said carrier and said coupling surface.

11. A transport system as defined in claim 10, further including a plurality of reversely driven rollers rotatably mounted to said frame and interspersed among said forwardly driven rollers along substantially parallel axes, said reversely driven rollers coupled to simultaneously rotate in a direction opposite the first direction; wherein said coupling surface comprises an outside surface of said reversely driven rollers, whereby said pickup means rotates in response to rotation of said reversely driven rollers when said carrier is disposed on said conveyor.

12. A transport system as defined in claim 10, wherein said coupling surface comprises a cam track secured to said frame, whereby said pickup member rotates when said carrier moves along said conveyor.

* * * * *